Oct. 12, 1965     W. C. BELK     3,211,200
FRUIT SECTIONIZING BLADE
Original Filed June 26, 1959     3 Sheets-Sheet 3
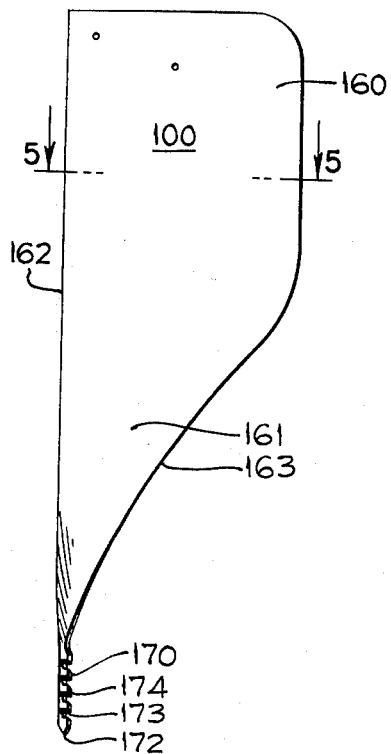
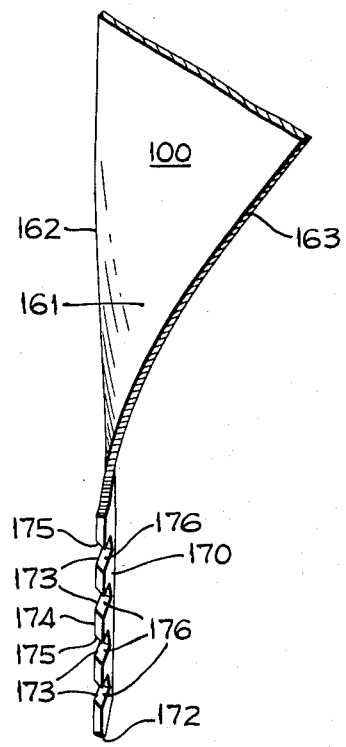
INVENTOR
WILBER C. BELK
ATTORNEY

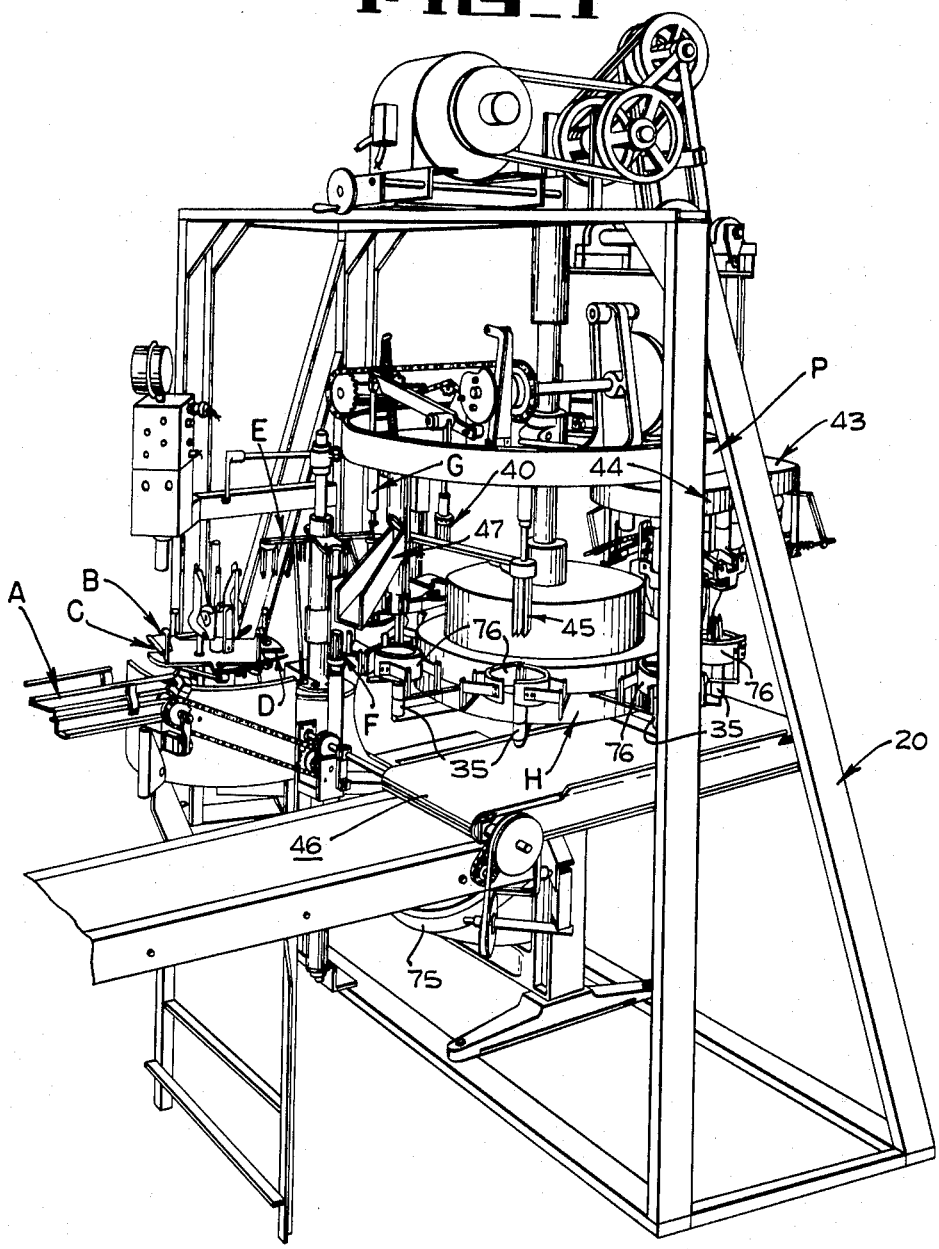

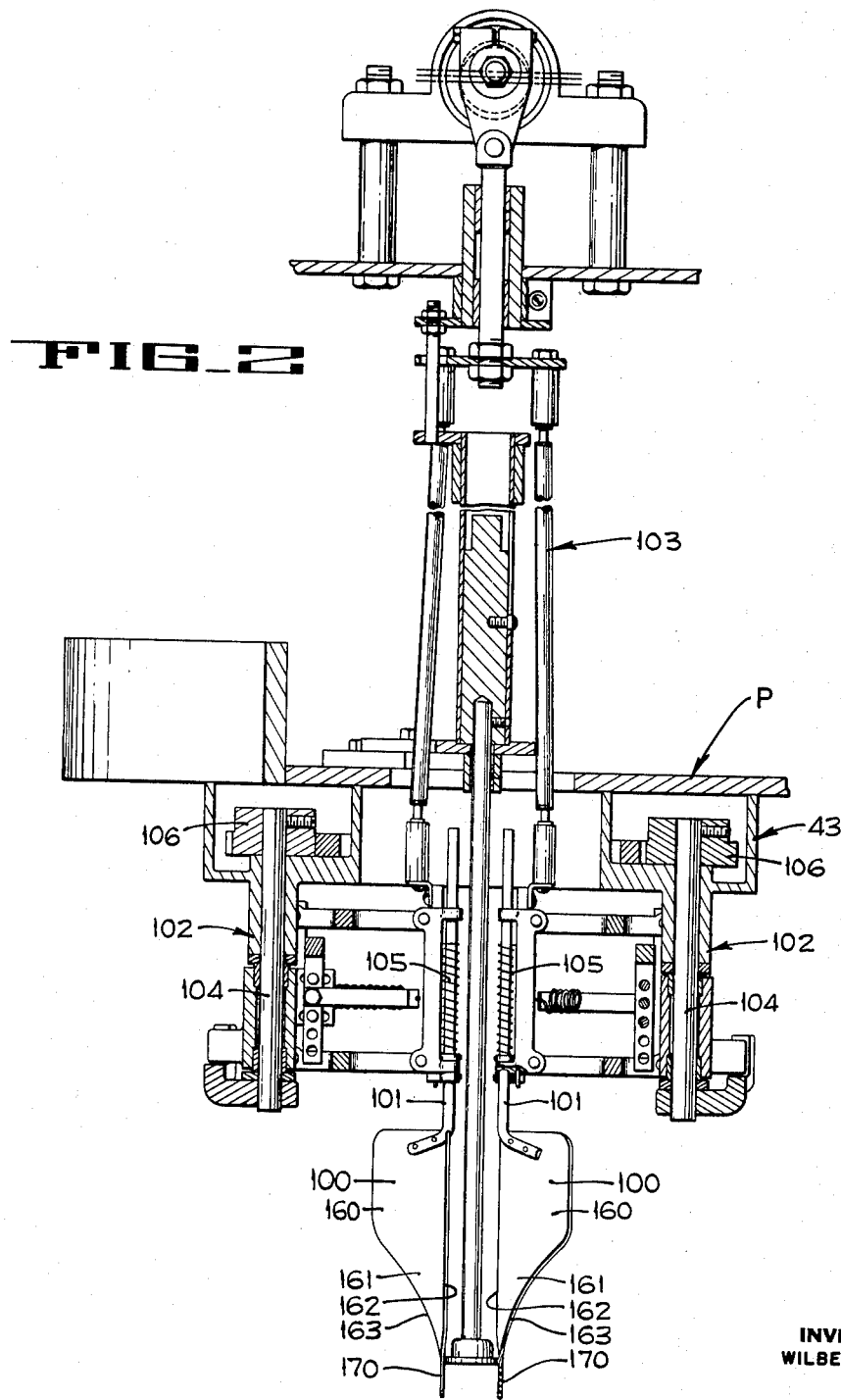

3,211,200
FRUIT SECTIONIZING BLADE
Wilber C. Belk, Lakeland, Fla., assignor to FMC Corporation, San Jose, Calif., a corporation of Delaware
Original application June 26, 1959, Ser. No. 823,107, now Patent No. 3,105,531, dated Oct. 1, 1963. Divided and this application Feb. 4, 1963, Ser. No. 255,926
1 Claim. (Cl. 146—3)

This application is a division of my pending application, Serial No. 823,107, filed June 26, 1959, now Patent No. 3,105,531 granted October 1, 1963.

The invention pertains to the processing of citrus fruit, and more particularly relates to an improved blade for sectionizing citrus fruit.

The meat or juice-bearing portion of citrus fruit is composed of groups of interconnected juice sacs, each group being in the form of a segmental section which is surrounded by a membrane. The portions of the segment wall, which extend more or less radially from the core of the whole fruit and define the plane faces of the segment, are referred to as radial membranes, while the portion of the segment wall which lies adjacent the peel of the fruit and defines the spherical face of the segment is called the outer membrane.

In the citrus fruit industry, "sectionizing" is an operation by which the naturally-shaped membrane-free meat segments are removed from the citrus fruit, particularly grapefruit, and this operation is generally performed by first peeling off the outer skin and albedo, subjecting the fruit to a hot lye treatment to remove the outer membrane from the segments, and stripping individually the segmental juice sac groups from their radial membranes. The stripping operation is usually carried out manually by inserting a blade between the meat segments and each radial membrane and then cutting the meat segment loose from the membrane. Such manual sectionizing is inefficient since the speed at which the operators must work makes it impossible for them to handle small, irregular meat segments or to carefully cut loose even the larger meat segments.

Machines previously proposed for sectionizing grapefruit had met with limited success due to the fact that the segments in grapefruit vary in number between 9 and 16 in the average fruit and usually are of unequal size and shape. In addition, the radial membranes seldom extend in true radial directions or in flat planes. These and other variable characteristics of citrus fruit make it difficult to use a sectionizing machine to obtain well-formed, membrane-free meat segments in their natural size without excessive rupturing of the juice sacs of the meat.

It is therefore an object of the present invention to provide an improved fruit processing machine.

Another object is to provide an improved sectionizing blade.

Other and further objects and advantages of the present invention will become apparent from the following description taken in connection with the accompanying drawings, in which:

FIG. 1 is a more or less diagrammatic perspective of the grapefruit sectionizing machine of the present invention, with parts broken away.

FIG. 2 is an enlarged vertical section taken through one of the fruit processing heads used in the machine of FIG. 1.

FIG. 3 is an elevation of a sectionizing blade used in the machine of the present invention.

FIG. 4 is an enlarged fragmentary perspective view of the blade of FIG. 3 particularly showing the angular relationship of the upper and lower portions of the blade.

FIG. 5 is a section taken on line 5—5 of FIG. 3.

FIG. 6 is an enlarged elevation of the lower end of the blade, the view being taken looking in the direction indicated by arrows 6—6 of FIG. 5.

FIG. 7 is an elevation of the lower end of the blade, the view being taken looking in the direction of arrows 7—7 of FIG. 6.

The improved sectionizing blade of the present invention is particularly adapted for use in a citrus fruit sectionizing machine of the type disclosed in the copending U.S. application of H. W. Grotewold, Serial No. 730,335, filed April 23, 1958, now Patent No. 3,072,160, and assigned to the assignee of the present application.

In general, the machine comprises a frame support structure 20 (FIG. 1) made up of channels and angle members rigidly welded together. The peeled and treated grapefruit, which are to be sectionized, are advanced on a supply conveyor A (FIG. 1) to a position within reach of an operator, who stands in front of a feed turret B and places each grapefruit on the feed turret at station C of the turret. The feed turret B is intermittently indexed through 90° angular increments in a clockwise direction to bring each grapefruit to a transfer station D where the grapefruit is automatically transferred from the feed turret B to a transfer turret E which is also arranged to be intermittently indexed in 90° increments in synchronism with the movements of the feed turret B, but in a counterclockwise direction. The grapefruit is then moved to a seed disturbing station F and then to a second transfer station G where it is deposited in one of a plurality of fruit carriers 35 mounted on a main turret H. The main turret H is arranged to be intermittently indexed through 45° angular increments in a clockwise direction (FIG. 1) to move each grapefruit successively into operative association with a seed disturber unit 40 and with first, second, third and fourth heads, (only third and fourth heads 43 and 44, respectively, being shown) which are carried by and project downwardly from a vertically movable tool carrier or top plate P. Each head has a plurality of blades which will be described presently, that are arranged to be vibrated rapidly in a vertical direction as they are moved downwardly into a grapefruit to separate the pie-shaped meat segments from the membranes enclosing them. The sectionized grapefruit, with the separated segments disposed around the core, is then brought under a spinner or stripper unit 45 that wraps the radial membranes around the stationary core, causing any remaining bond between the membranes and the segments to be completely broken and causing the segments to drop onto a discharge conveyor 46. The core is then moved to a position under a core stripping mechanism 47 which removes the core from the fruit carrier.

The mechanisms of the machine, including the supply conveyor A, the feed turret B, the transfer turret E, the main turret H, the discharge conveyor 46, and the drive mechanism for the conveyors and turrets, are substantially identical to those disclosed in the above-mentioned Grotewold application, and reference may be had to said application for a complete description of the construction and operation of these mechanisms.

The drive mechanism includes a barrel cam 75 (FIG. 1) which is operatively connected through a Geneva drive mechanism (not shown) to the main turret H to intermittently move the current in 45° angular increments about a vertical axis, and is operatively connected through a push rod (not shown) to the tool-carrying plate P to reciprocate the plate vertically in timed relation with the movement of the main turret. The main turret H carries eight of the above-mentioned, equally-spaced, prong-type fruit carrier units 35 (4 only being shown in FIG. 1) on which the grapefruit are carried. A band type clamping mechanism 76 is associated with each carrier unit for holding each grapefruit in compact form and in a predetermined orientation as it is carried through the machine on one of the intermittently moving carrier units. The construction and operation of the units 35, the clamping mechanisms 76, and the associated mechanisms are described in the above-mentioned Grotewold application.

Application Serial No. 823,107 of which the present application is a division, is particularly concerned with an improved method of separating the pie-shaped segments of the grapefruit from the enclosing membranes by moving a plurality of specially designed separator blades down through the grapefruit and vibrating the blades during the downward movement. To carry out this vibrating sectionizing operation, the blade-carrying heads, including heads 43 and 44, are arranged to support the blades for vertical reciprocation and to control the horizontal movement of the blades as they are vibrated. Since the present application is concerned only with the sectionizing blade, the actuating mechanisms of the parent application will not be described in detail, it being understood that reference may be had to said application for a description of any mechanism not mentioned herein.

Each of the sectionizing blades 100 (FIG. 2) is fitted in a wedge-shaped groove in the lower end of a support rod 101 that is riveted to the blade and projects upwardly from the main body portion of the blade. Each rod 101 has a torsion spring 105 associated therewith and is mounted in a blade control mechanism 102 which is arranged to control the movements of the blade as it is vibrated in a vertical direction by a vibrator mechanism 103 and moved in a horizontal direction about the axis of vertical rod 104 by a gear type cocking mechanism 106, as described in detail in my parent application.

The sectionizing blade 100, which is particularly shown in FIGS. 3-7, is preferably made of a material that has a hard smooth surface such as stainless steel. The blade has an upper flat body portion 160 (FIG. 3) which is approximately 1⅞" wide and 1/32" thick. While a width of 1⅞" has given satisfactory results it will be understood that the blade must in general be wider than the radial extent of the pie-shaped segments of the particular grapefruit being processed so that, when the blade is moved downwardly through the grapefruit, it will engage each segment along its entire radial extent to separate the segment from the radial membrane without requiring any radially outward movement of the blade. The body portion 160 has a lower tapering portion 161 which has a substantially straight edge 162 and a slanted edge 163 that is formed on the arc of a circle having a radius of approximately seven inches. At the lower end of the blade, a toothed probe or cutter 170 is formed, said probe being twisted out of the plane of the body portion 160 at an angle Z of approximately 56° relative thereto, as particularly shown in FIG. 5. The probe has a lateral dimension X (FIG. 6) of approximately ⅛", and a longitudinal dimension Y of approximately ⅝". The lower end of the probe has two edges 171 and 171a cut off at angles Z1 and Z2 of approximately 45°, and the extreme lower end 172 is relatively blunt and is formed with a radius. The rounded lower edge of the blade is so designed that it will not pierce grapefruit seeds or membranes that might be in its path. Further, the slanted edges 171 and 171a will cause the blade to be deflected sidewise and pass down alongside such objects. As seen in FIGS. 6 and 7, a plurality of notches 173 are formed in the probe by cutting slots in one edge 174 of the probe at an angle of approximately 45° relative to the plane of the probe. Thus, downwardly extending cutting edges 175 are formed along one side of the probe, and upwardly projecting cutting edges 176 are formed on an opposite side of the probe. The slots 173 are so formed that a ridge 177 is defined between opposed slanted bottom walls of the slots. It is to be noted that the cutting edges are disposed inwardly of the side edge 174 which remains relatively blunt.

In the operation of the machine, grapefruit are continuously fed to the machine until each of the carriers 35 have received a grapefruit and impaled it in a fixed position with a clamp member 76 disposed around the periphery of the grapefruit. With the vibrator mechanism continuously vibrating the blades in a vertical direction and the plate P in its uppermost position, the cocking mechanism 106 rotates each of its associated gears in a direction to move the associated blade holder to a spring-loaded cocked position. Then, when the heads are moved downwardly and the blades have penetrated down into the grapefruit about three-eighths or one-half inch, the downward movement is stopped and the blade holders are released from their restrained or cocked position, causing the blades to move toward the adjacent radial membrane of the grapefruit. During this sidewise or lateral movement, the probe on the blade cuts its way across the apex end of the grapefruit segment until it engages the membrane. The relatively blunt side face 174 of the probe does not penetrate the membrane but stops the sidewise movement of the probe when it engages the membrane. At this point, the barrel cam 75 causes the blades to once more move downwardly through the grapefruit segment. During this downward movement, the torsion spring 105 associated with each blade urges the blade against the membrane of the grapefruit while the upper edge of the membrane engages the curved lower edge of the blade and rotates it in a direction to move it toward a position of parallelism with the membranes. Thus the blade is kept in close contact with the membrane of the grapefruit during the downward vibrating movement. Also, during the downward vibrating movement the meat segment is separated from the membrane, not by a cutting action, but by a series of blows which move the meat segment away from the membrane without rupturing the juice sacs at the surface of the meat segment.

When all of the blades have been carried downwardly through the grapefruit, the top plate P is moved upwardly to carry the blades out of the grapefruit. When the plate P is again in its uppermost position, the cocking mechanism is again actuated to once more move the blades to their spring-loaded cocked position ready for the next downward movement of the blades.

From the foregoing description it will be seen that the present invention provides an efficient sectionizing machine. Particularly, the blade 100 with its toothed, cutting probe 170 and its unsharpened curved edge 163 makes possible the effective separation of the meat of the fruit from the adjacent membrane.

It will be understood that modifications and variations may be effected without departing from the scope of the novel concepts of the present invention.

Having thus described my invention, what I claim as new and desire to protect by Letters Patent is:

A citrus fruit sectionizing blade comprising a flat thin body portion having a concave unsharpened edge formed on an arc of a circle having a radius of substantially seven inches, said edge being arranged to enter between a radial membrane of the fruit being processed and the attached meat segment of the fruit to separate the segment from the membrane.

References Cited by the Examiner

UNITED STATES PATENTS

| | | |
|---|---|---|
| 1,261,954 | 4/18 | Newman. |
| 1,477,662 | 12/23 | Perry. |
| 1,542,470 | 6/25 | Nordquist. |
| 2,247,589 | 7/41 | Polk et al. |
| 2,254,187 | 8/41 | Polk et al. |
| 2,692,428 | 10/54 | Morishita _____ 30—24 |

FOREIGN PATENTS

| | | |
|---|---|---|
| 861,656 | 1/53 | Germany. |

J. SPENCER OVERHOLSER, *Primary Examiner.*